US009795169B1

(12) United States Patent
Zhu

(10) Patent No.: US 9,795,169 B1
(45) Date of Patent: Oct. 24, 2017

(54) REPLACEABLE VAPORIZER ASSEMBLY AND ELECTRONIC CIGARETTE HAVING THE SAME

(71) Applicant: Xiaochun Zhu, Shenzhen (CN)

(72) Inventor: Xiaochun Zhu, Shenzhen (CN)

(*) Notice: Subject to any disclaimer, the term of this patent is extended or adjusted under 35 U.S.C. 154(b) by 6 days.

(21) Appl. No.: 15/201,634

(22) Filed: Jul. 5, 2016

(51) Int. Cl.
*A24F 47/00* (2006.01)
*H05B 3/42* (2006.01)
*B65B 3/04* (2006.01)
*F16J 15/02* (2006.01)

(52) U.S. Cl.
CPC .............. *A24F 47/008* (2013.01); *B65B 3/04* (2013.01); *F16J 15/021* (2013.01); *H05B 3/42* (2013.01); *H05B 2203/021* (2013.01)

(58) Field of Classification Search
CPC .... H05B 2203/021; H05B 3/42; F16J 15/021; B65B 3/04; A24F 47/008
USPC ......................................... 131/329, 271, 273
See application file for complete search history.

(56) References Cited

U.S. PATENT DOCUMENTS

| | | | | |
|---|---|---|---|---|
| 4,692,590 | A * | 9/1987 | Spector ................. | A24F 47/008 219/260 |
| 2013/0087160 | A1* | 4/2013 | Gherghe ............... | A24F 47/008 131/329 |
| 2013/0180533 | A1* | 7/2013 | Kim ...................... | A24F 47/008 131/273 |
| 2013/0220315 | A1* | 8/2013 | Conley ................. | A24F 47/008 128/202.21 |
| 2014/0314397 | A1* | 10/2014 | Alima ................... | A24F 47/008 392/386 |
| 2015/0027471 | A1* | 1/2015 | Feldman ................. | H05B 3/16 131/329 |
| 2015/0090256 | A1* | 4/2015 | Chung ................ | A61M 15/002 128/202.21 |
| 2015/0245659 | A1* | 9/2015 | Depiano ............... | A24F 47/008 392/397 |
| 2015/0320116 | A1* | 11/2015 | Bleloch ................. | A61M 15/06 219/628 |
| 2015/0335071 | A1* | 11/2015 | Brinkley ................. | F22B 1/284 131/328 |
| 2016/0015081 | A1* | 1/2016 | Liu .......................... | H05B 3/16 131/329 |

(Continued)

*Primary Examiner* — Abdullah Riyami
*Assistant Examiner* — Nelson R Burgos-Guntin

(57) ABSTRACT

Electronic cigarettes may include an electronic cigarette, and a replaceable vaporizer assembly. Electronic cigarette may include a mouthpiece, an E-liquid storage tank, an E-liquid storage tank cover, a cylindrical connector, and a vaporizer mounting base having an internal thread. The replaceable vaporizer assembly may include a vaporizer assembly mounting base having an external thread of the vaporizer assembly mounting base. The replaceable vaporizer assembly may be replaced by removing mouthpiece, rotating cylindrical connector to misalign a first and a second cylindrical connector openings of cylindrical connector against a first and a second vaporizer assembly mounting base openings of the vaporizer assembly mounting base to prevent E-liquid leakage, rotating replaceable vaporizer assembly through vaporizer central air passage tube to detach vaporizer assembly mounting base from vaporizer mounting base, pulling up the replaceable vaporizer assembly, replacing a new replaceable vaporizer assembly, and reinstalling the mouthpiece back in place.

20 Claims, 7 Drawing Sheets

(56) References Cited

U.S. PATENT DOCUMENTS

| | | | |
|---|---|---|---|
| 2016/0073692 A1* | 3/2016 | Alarcon | A24F 47/008 |
| | | | 131/329 |
| 2016/0219936 A1* | 8/2016 | Alarcon | A24F 47/008 |
| 2016/0332754 A1* | 11/2016 | Brown | A24F 47/008 |
| 2016/0334119 A1* | 11/2016 | Cameron | F24F 3/16 |
| 2016/0338408 A1* | 11/2016 | Guenther, Jr. | B23P 19/002 |
| 2016/0338412 A1* | 11/2016 | Monsees | A24F 47/008 |
| 2016/0361508 A1* | 12/2016 | Cohen | A61M 15/0003 |
| 2017/0013880 A1* | 1/2017 | O'Brien | A24F 47/008 |
| 2017/0049153 A1* | 2/2017 | Guo | A24F 47/008 |
| 2017/0112196 A1* | 4/2017 | Sur | A24F 47/008 |
| 2017/0143038 A1* | 5/2017 | Dickens | A24F 47/008 |
| 2017/0156404 A1* | 6/2017 | Novak | A24F 47/008 |
| 2017/0181471 A1* | 6/2017 | Phillips | A24F 47/008 |
| 2017/0188626 A1* | 7/2017 | Davis | A24F 47/008 |

\* cited by examiner

REPLACEABLE VAPORIZER ASSEMBLY AND ELECTRONIC CIGARETTE HAVING THE SAME

FIELD

The present disclosure generally relates to the field of electronic cigarette, and more particularly to replaceable vaporizer assemblies and electronic cigarettes having the replaceable vaporizer assemblies.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

It is well known that smoking cigarette is harmful to smoker's health. The active ingredient in a cigarette is mainly nicotine. During smoking, nicotine, along with tar aerosol droplets produced in the cigarette burning, are breathed into the alveolus and absorbed quickly by the smoker. Once nicotine is absorbed into the blood of the smoker, nicotine then produces its effect on the receptors of the smoker's central nervous system, causing the smoker relax and enjoy an inebriety similar to that produced by an exhilarant.

The electronic cigarette is sometimes referred as electronic vaporing device, personal vaporizer (PV), or electronic nicotine delivery system (ENDS). It is a battery-powered device which simulates tobacco smoking. It generally uses a heating element that vaporizes a liquid solution (e-liquid). Some solutions contain a mixture of nicotine and a variety of flavorings, while others release a flavored vapor without nicotine. Many are designed to simulate smoking experience, such as cigarette smoking or cigar smoking. Some of them are made with similar appearance, while others are made considerably different in appearance.

Replacing a vaporizer in a conventional electronic cigarette is difficult. When E-liquid gets on the vaporizer while someone is replacing the vaporizer, he/she may be contaminated with E-liquid, and it is hard to clean. Therefore, it is desirable to replace the vaporizer easily without getting E-liquid contamination.

Therefore, an unaddressed need exists in the art to address the aforementioned deficiencies and inadequacies.

SUMMARY

In one aspect, the present disclosure relates to a replaceable vaporizer assembly. In certain embodiments, the replaceable vaporizer assembly may include: a vaporizer central air passage tube, an E-liquid storage medium, a heating element, a vaporizer assembly mounting base, a vaporizer sealing ring, a vaporizer insulation tube, and a vaporizer positive terminal. The vaporizer central air passage tube may define a first vaporizer central air passage tube opening, and a second vaporizer central air passage tube opening. The heating element may include a positive terminal and a negative terminal. The vaporizer assembly mounting base may include an external thread. The vaporizer assembly mounting base may define a first vaporizer assembly mounting base opening and a second vaporizer assembly mounting base opening. The vaporizer assembly mounting base is electrically coupled to the negative terminal of the heating element. The vaporizer positive terminal is electrically coupled to the positive terminal of the heating element. The vaporizer insulation tube may be configured to insulate the vaporizer positive terminal and the vaporizer assembly mounting base. In certain embodiments, the heating element is positioned inside of the E-liquid storage medium. The E-liquid storage medium is positioned inside of the vaporizer assembly mounting base. The vaporizer assembly mounting base is positioned inside of the vaporizer central air passage tube.

In another aspect, the present disclosure relates to an electronic cigarette. In certain embodiments, the electronic cigarette may include: a mouthpiece, an E-liquid storage tank, an E-liquid storage tank cover, a cylindrical connector, and an air intake base. The E-liquid storage tank may include a top end and a bottom end. The E-liquid storage tank cover may be positioned on the top end of the E-liquid storage tank. The cylindrical connector may include an external thread. The cylindrical connector may define a first cylindrical connector opening, and a second cylindrical connector opening. The air intake base may define an air intake groove of the air intake base. The air intake base is positioned at the bottom end of the E-liquid storage tank.

In yet another aspect, the present disclosure relates to an electronic cigarette. In certain embodiments, the electronic cigarette may include an electronic cigarette, and a replaceable vaporizer assembly. The electronic cigarette may include a mouthpiece, an E-liquid storage tank, an E-liquid storage tank cover, a cylindrical connector, and a vaporizer mounting base having an internal thread. The replaceable vaporizer assembly may include a vaporizer assembly mounting base having an external thread of the vaporizer assembly mounting base. In certain embodiments, the replaceable vaporizer assembly may be replaced by removing the mouthpiece, rotating the cylindrical connector in a first direction to misalign a first cylindrical connector opening and a second cylindrical connector opening of the cylindrical connector against a first vaporizer assembly mounting base opening and a second vaporizer assembly mounting base opening of the vaporizer assembly mounting base to prevent E-liquid in the E-liquid storage tank from entering the replaceable vaporizer assembly, rotating the replaceable vaporizer assembly through the vaporizer central air passage tube to unscrew the external thread of the vaporizer assembly mounting base from an internal thread of the vaporizer mounting base, pulling up the replaceable vaporizer assembly, replacing a new replaceable vaporizer assembly, and reinstalling the mouthpiece back in place.

These and other aspects of the present disclosure will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and, together with the written description, serve to explain the principles of the disclosure. Wherever possible, the same reference numbers are used throughout the drawings to refer to the same or like elements of an embodiment. The drawings do not limit the present disclosure to the specific embodiments disclosed and described herein. The drawings are not necessarily to scale, emphasis instead being placed upon clearly illustrating the principles of the disclosure, and wherein.

DETAILED DESCRIPTION

Figure 1:
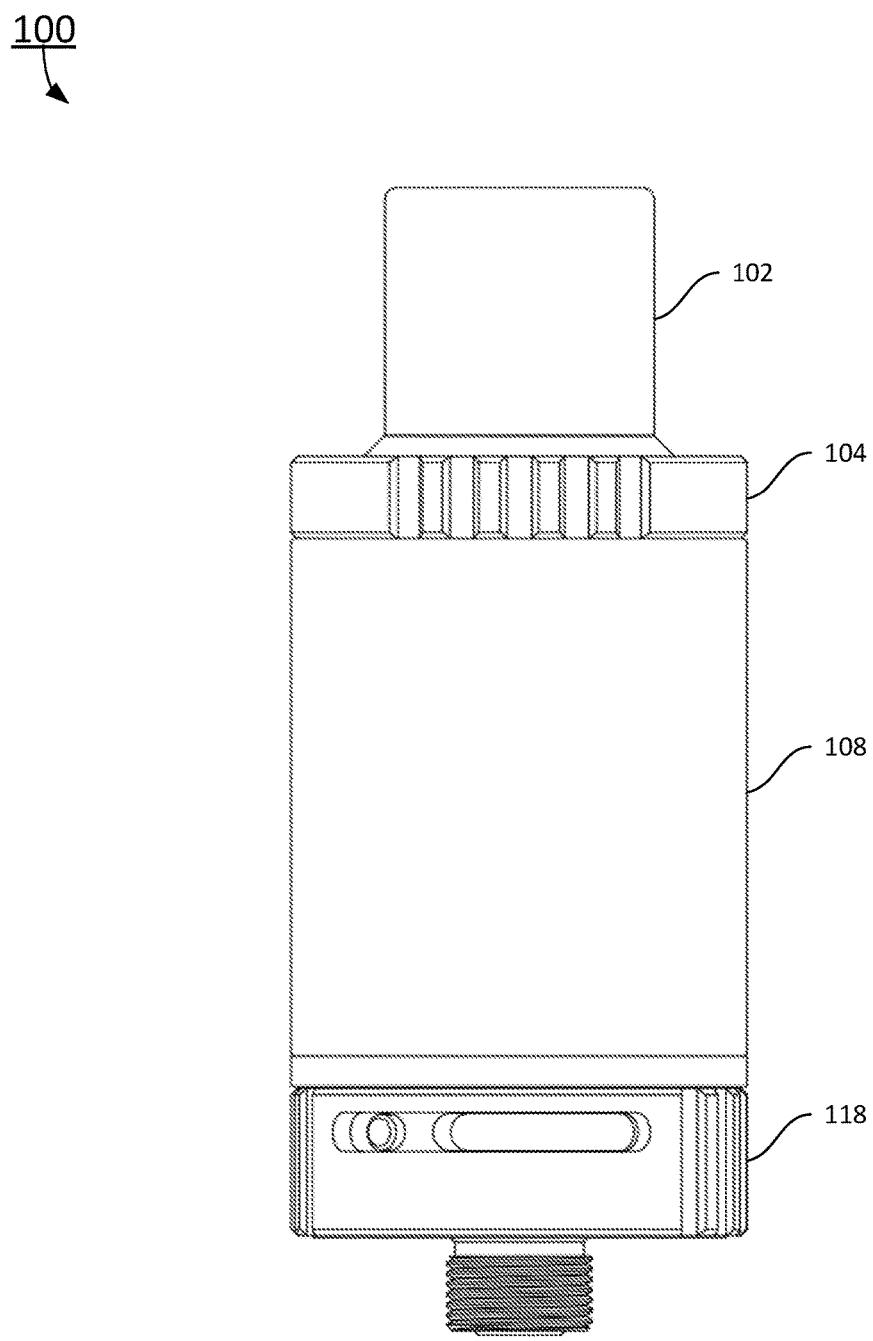
FIG. 1 is an external view of an exemplary electronic cigarette according to certain embodiments of the present disclosure.

The present disclosure will now be described more fully hereinafter with reference to the accompanying drawings, in which exemplary embodiments of the disclosure are shown. This disclosure may, however, be embodied in many different forms and should not be construed as limited to the embodiments set forth herein. Rather, these embodiments are provided so that this disclosure will be thorough and complete, and will fully convey the scope of the disclosure to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom", "upper" or "top," and "front" or "back" may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximates, meaning that the term "around", "about" or "approximately" can be inferred if not expressly stated.

Many specific details are provided in the following descriptions to make the present disclosure be fully understood, but the present disclosure may also be implemented by using other manners different from those described herein, so that the present disclosure is not limited by the specific embodiments disclosed in the following.

The description will be made as to the embodiments of the present disclosure in conjunction with the accompanying drawings FIGS. 1 through 7.

Referring now to FIG. 1, an external view of an exemplary electronic cigarette 100 is shown according to certain embodiments of the present disclosure. The electronic cigarette 100 includes multiple distinctive features of present disclosure: an easy replaceable vaporizer assembly, an easy E-liquid refilling mechanism, and an adjustable air intake for the electronic cigarette 100. In certain embodiments, the electronic cigarette 100 may include: a mouthpiece 102, an E-liquid storage tank cover 104, an E-liquid storage tank 108, a vaporizer mounting base 120, an air intake adjustment ring 118, and a positive terminal of a power connector 124. The mouthpiece 102 may be removed from top of the electronic cigarette 100 to replace a replaceable vaporizer assembly. The E-liquid storage tank cover 104 may be threadedly removed to refill E-liquid into the E-liquid storage tank 108. The air intake adjustment ring 118 defines at least one air intake groove 1181 which overlaps an air intake groove 1141 (not shown in FIG. 1) of an air intake base 114 (not shown in FIG. 1) such that when a user rotate the air intake adjustment ring 118 to a first predetermined angle, the air intake groove 1181 of the air intake adjustment ring 118 coincides with the air intake groove 1141 of the air intake base 114 to provide air from outside to a vaporizer inside the electronic cigarette 100. When the user rotate the air intake adjustment ring 118 to a second predetermined angle, the air intake groove 1181 of the air intake adjustment ring 118 misalign with the air intake groove 1141 of the air intake base 114 to shut off the air from outside to the vaporizer inside the electronic cigarette 100.

Figure 2:
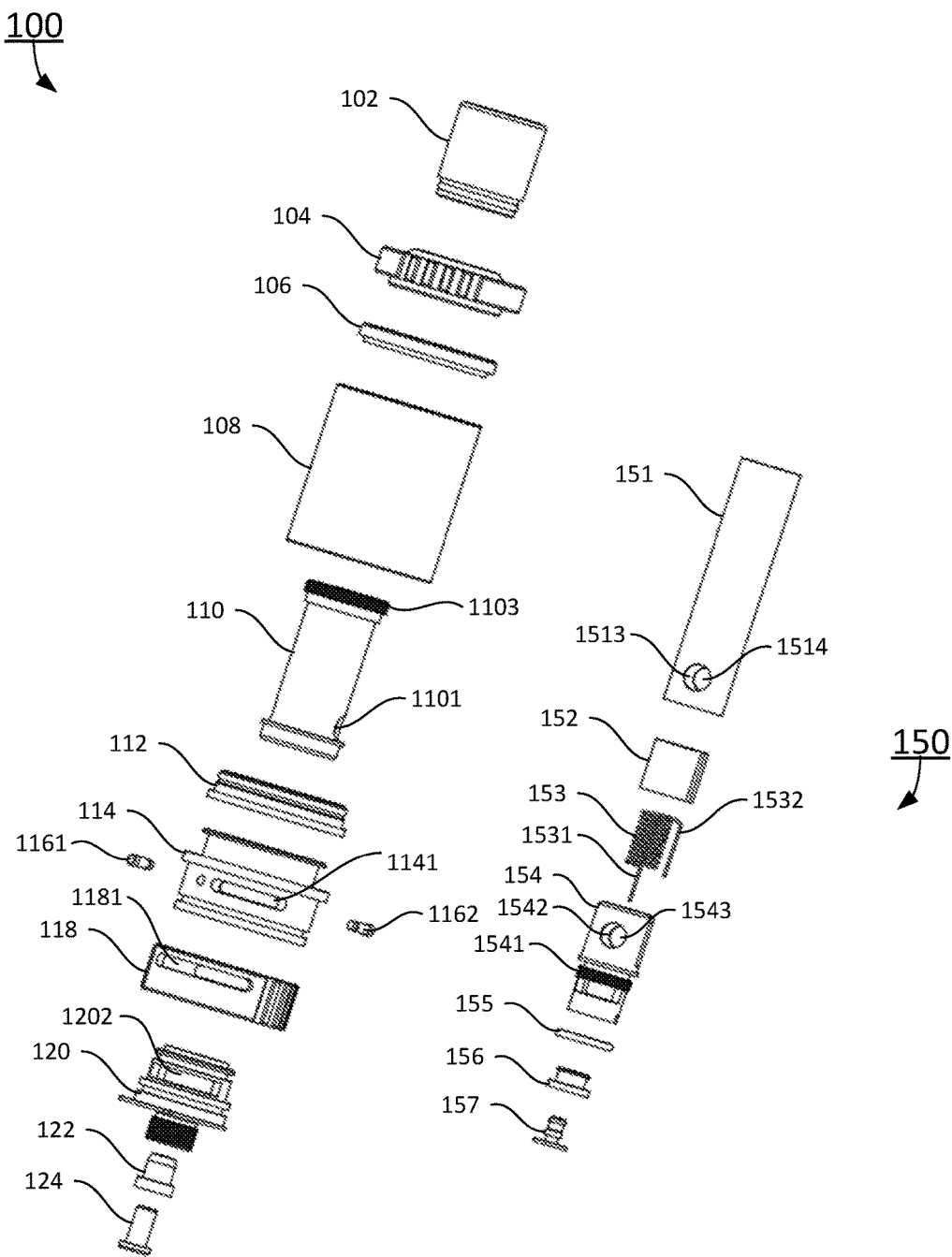
FIG. 2 is an exploded perspective view of the electronic cigarette having a replaceable vaporizer assembly according to certain embodiments of the present disclosure.
Figure 3:
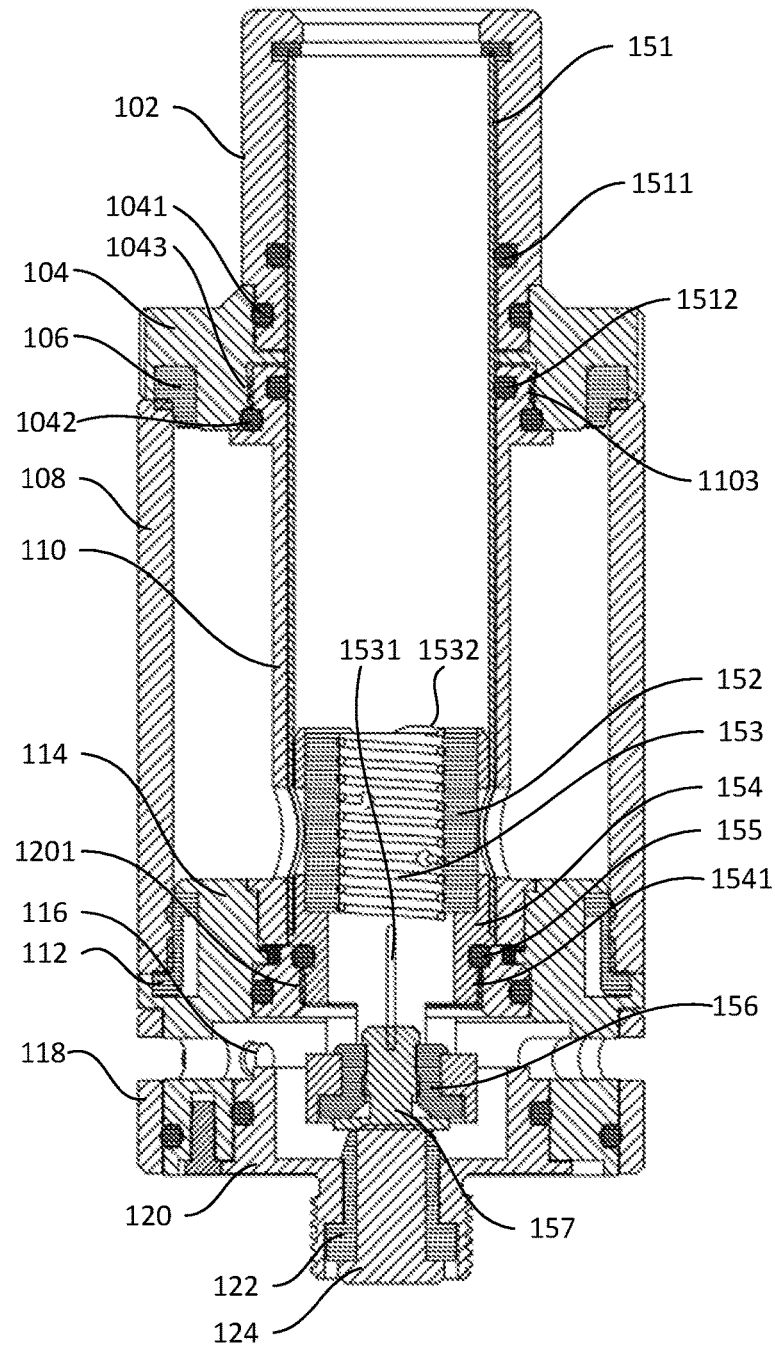
FIG. 3 is a detailed cross-sectional view of the electronic cigarette having the replaceable vaporizer assembly according to certain embodiments of the present disclosure.

Referring now to FIGS. 2 and 3, an exploded perspective view of the electronic cigarette 100 having a replaceable vaporizer assembly 150 and a detailed cross-sectional view of the electronic cigarette 100 are shown according to certain embodiments of the present disclosure.

In one aspect, the present disclosure relates to the replaceable vaporizer assembly 150. In certain embodiments, the replaceable vaporizer assembly 150 may include: a vaporizer central air passage tube 151, an E-liquid storage medium 152, a heating element 153, a vaporizer assembly mounting base 154, a vaporizer sealing ring 155, a vaporizer insulation tube 156, and a vaporizer positive terminal 157.

In certain embodiments, the vaporizer central air passage tube 151 may define a first vaporizer central air passage tube opening 1513, and a second vaporizer central air passage tube opening 1514. In certain embodiments, the vaporizer central air passage tube 151 is sealed by a first vaporizer central air passage tube sealing ring 1511 to prevent air leakage, and a second vaporizer central air passage tube sealing ring 1512 to prevent E-liquid leakage.

The heating element 153 may include a positive terminal 1531 and a negative terminal 1532. The vaporizer assembly mounting base 154 may include an external thread 1541. The vaporizer assembly mounting base 154 may define a first vaporizer assembly mounting base opening 1542 and a second vaporizer assembly mounting base opening 1543. The vaporizer assembly mounting base 154 is electrically coupled to the negative terminal 1532 of the heating element 153. The vaporizer positive terminal 157 is electrically coupled to the positive terminal 1531 of the heating element 153. The vaporizer insulation tube 156 may be configured to insulate the vaporizer positive terminal 157 and the vaporizer assembly mounting base 154.

In certain embodiments, the heating element 153 is positioned inside of the E-liquid storage medium 152. The E-liquid storage medium 152 is positioned inside of the vaporizer assembly mounting base 154. The vaporizer assembly mounting base 154 is positioned inside of the vaporizer central air passage tube 151.

In certain embodiments, the external thread 1541 of the vaporizer assembly mounting base 154 may be threadedly connected to an internal thread 1201 of a vaporizer mounting base 120. In certain embodiments, each of the external thread 1541 of the vaporizer assembly mounting base 154 and the internal thread 1201 of the vaporizer mounting base 120 may include multiple threads.

In certain embodiments, the heating element 153 may include multiple heating elements electrically coupled in parallel to generate increased amount of vapor.

In another aspect, the present disclosure relates to the electronic cigarette 100. In certain embodiments, the electronic cigarette 100 may include: a mouthpiece 102, an E-liquid storage tank 108, an E-liquid storage tank cover 104, a cylindrical connector 110, and an air intake base 114. The E-liquid storage tank 108 may include a top end and a bottom end. The E-liquid storage tank cover 104 may be positioned on the top end of the E-liquid storage tank 108. The cylindrical connector 110 may include an external thread 110. The cylindrical connector 110 may define a first cylindrical connector opening 1101, and a second cylindrical connector opening 1102. The air intake base 114 may define an air intake groove 1141 of the air intake base 114. The air intake base 114 is positioned at the bottom end of the E-liquid storage tank 108.

In certain embodiments, the E-liquid storage tank 108 is positioned between the E-liquid storage tank cover 104 and the air intake base 114, sealed by a first sealing ring 106 between the E-liquid storage tank cover 104 on the top end of the E-liquid storage tank 108 and the second sealing ring 112 between the bottom end of the E-liquid storage tank 108 and the air intake base 114.

In certain embodiments, the electronic cigarette 100 may include: an air intake ring adjustment ring 118, and a vaporizer mounting base 120. The air intake ring adjustment ring 118 may define an air intake groove 1181. The vaporizer mounting base 120 may define an air intake groove 1202.

In yet another aspect, the present disclosure relates to an electronic cigarette 100 having a replaceable vaporizer assembly 150. The electronic cigarette 100 may include a mouthpiece 102, an E-liquid storage tank 108, an E-liquid storage tank cover 104, a cylindrical connector 110, and a vaporizer mounting base 120 having an internal thread 1201. The replaceable vaporizer assembly 150 may include a vaporizer assembly mounting base 154 having an external thread 1541 of the vaporizer assembly mounting base 154.

In certain embodiments, the replaceable vaporizer assembly 150 may include: the vaporizer central air passage tube 151, an E-liquid storage medium 152, a heating element 153, a vaporizer assembly mounting base 154, a vaporizer sealing ring 155, a vaporizer insulation tube 156, and a vaporizer positive terminal 157. The vaporizer central air passage tube 151 may define a first vaporizer central air passage tube opening 1513 and a second vaporizer central air passage tube opening 1514. The heating element 153 may include a positive terminal 1531 and a negative terminal 1532. The vaporizer assembly mounting base 154 may define the first vaporizer assembly mounting base opening 1542 and the second vaporizer assembly mounting base opening 1543. The vaporizer assembly mounting base 154 is electrically coupled to the negative terminal 1532 of the heating element 153. The vaporizer positive terminal 157 may be electrically coupled to the positive terminal 1531 of the heating element 153. The vaporizer insulation tube 156 may be configured to insulate the vaporizer positive terminal 157 and the vaporizer assembly mounting base 154. In certain embodiments, the heating element 153 may be positioned inside of the E-liquid storage medium 152. The E-liquid storage medium 152 may be positioned inside of the vaporizer assembly mounting base 154. The vaporizer assembly mounting base 154 may be positioned inside of the vaporizer central air passage tube 151.

In certain embodiments, the external thread 1541 of the vaporizer assembly mounting base 154 is threadedly connected to the internal thread 1201 of the vaporizer mounting base 120. In certain embodiments, each of the external thread 1541 of the vaporizer assembly mounting base 154 and the internal thread 1201 of the vaporizer mounting base 120 may include multiple threads.

In certain embodiments, when the air intake ring adjustment ring 118 is rotated to a first predetermined angle and the air intake groove 1181 of the air intake ring adjustment ring 118, the air intake groove 1202 of the vaporizer mounting base 120, and the air intake groove 1141 of the air intake base 114 are aligned such that air to the replaceable vaporizer assembly 150 is provided from outside of the electronic cigarette 100. When the air intake ring adjustment ring 118 is rotated to a second predetermined angle and the air intake groove 1181 of the air intake ring adjustment ring 118, the air intake groove 1202 of the vaporizer mounting base 120, and the air intake groove 1141 of the air intake base 114 are misaligned, the air to the replaceable vaporizer assembly 150 is shut off.

In certain embodiments, when the user adjusts the air intake ring adjustment ring 118 to the first predetermined angle, the rotation of the air intake ring adjustment ring 118 is stopped by a first air intake adjustment locking pin 1161 as defined as fully open position. When the user adjusts the air intake ring adjustment ring 118 to the second predetermined angle, the rotation of the air intake ring adjustment ring 118 is stopped by a second air intake adjustment locking pin 1162 as defined as fully closed position. The air intake ring adjustment ring 118 may be rotate in any angle continuously between the first predetermined angle and the second predetermined angle to adjust the amount of air intake into the replaceable vaporizer assembly 150.

Figure 4:
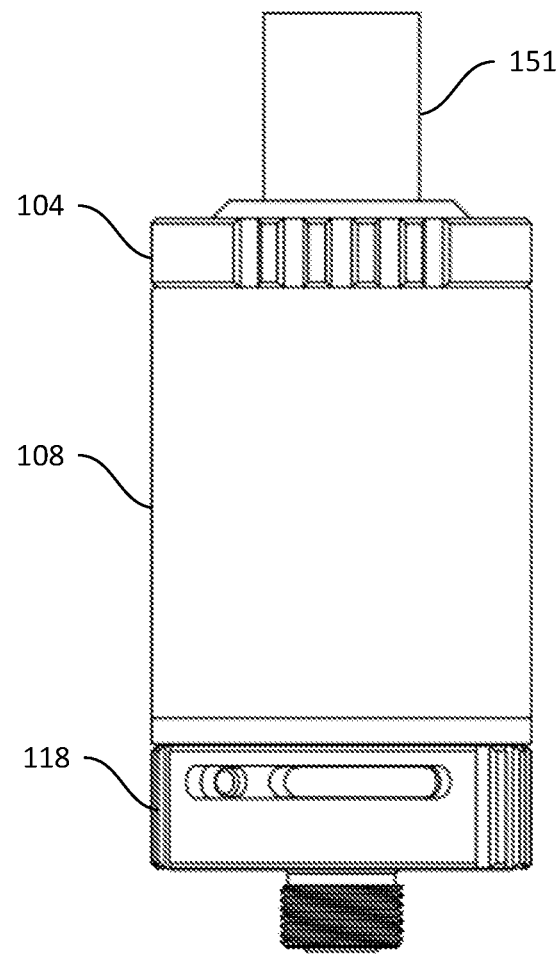
FIG. 4 is an external view of an exemplary electronic cigarette having a mouthpiece removed for replacing the replaceable vaporizer assembly according to certain embodiments of the present disclosure.
Figure 5:
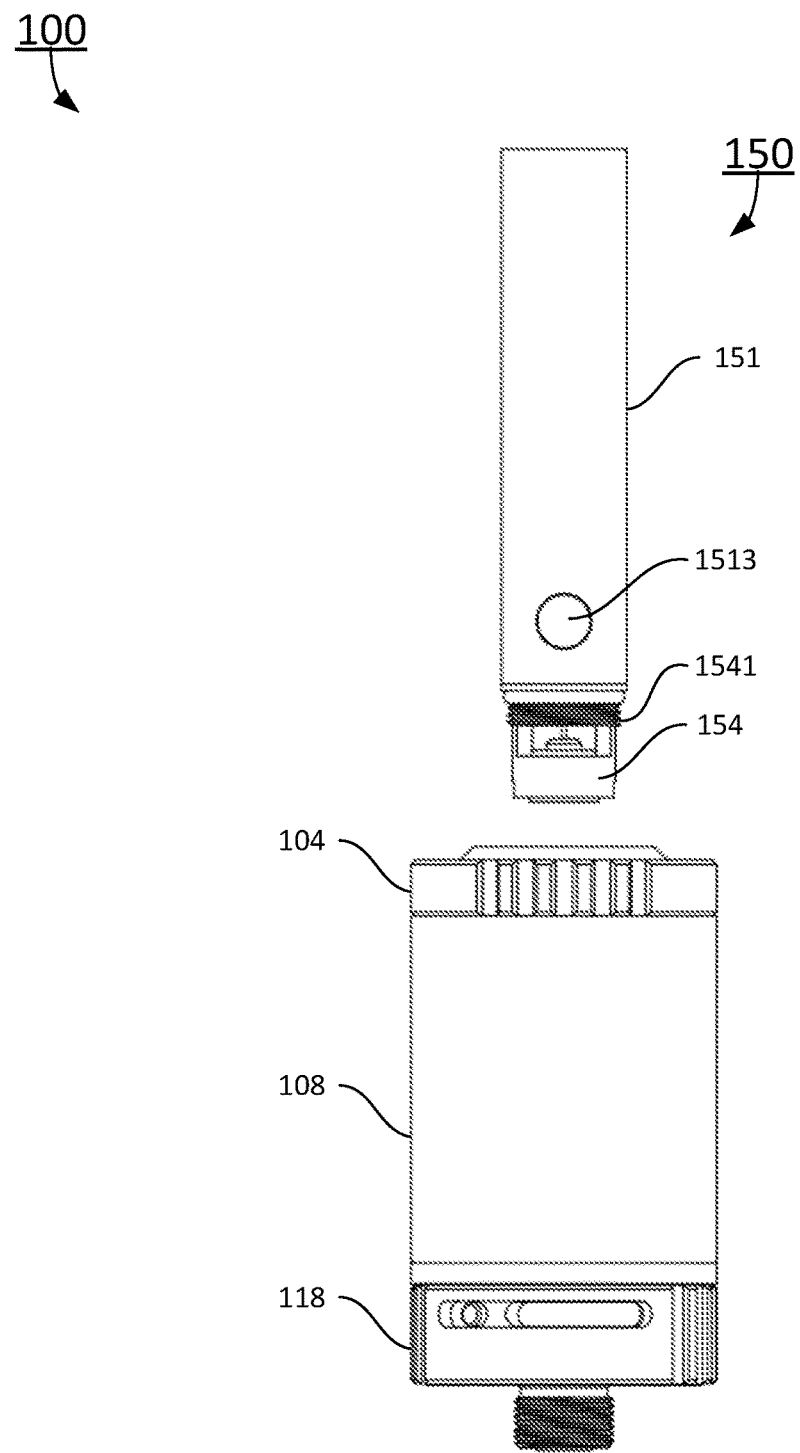
FIG. 5 is an external view of the exemplary electronic cigarette with the replaceable vaporizer assembly detached from the electronic cigarette according to certain embodiments of the present disclosure.

Referring now to FIGS. 4 and 5, an external view of the exemplary electronic cigarette 100 having a mouthpiece removed for replacing the replaceable vaporizer assembly 150, and having the replaceable vaporizer assembly 150 detached from the electronic cigarette 100 are shown, respectively, according to certain embodiments of the present disclosure.

In certain embodiments, the vaporizer central air passage tube 151 is positioned inside of the cylindrical connector 110 and the mouthpiece 102. The vaporizer central air passage tube 151 is sealed by the first vaporizer central air passage tube sealing ring 1511 to prevent air leakage and the second vaporizer central air passage tube sealing ring 1512 to prevent E-liquid leakage.

In certain embodiments, the cylindrical connector 110 defines the first cylindrical connector opening 1101, and the second cylindrical connector opening 1102. The vaporizer central air passage tube 151 defines a first vaporizer central air passage tube opening 1513, and a second vaporizer central air passage tube opening 1514. The vaporizer assembly base 154 defines a first vaporizer assembly base opening 1542, and a second vaporizer assembly base opening 1543.

In certain embodiments, the vaporizer central air passage tube 151 is installed between the cylindrical connector 110 and the vaporizer assembly base 154. The first cylindrical connector opening 1101 and the second cylindrical connector opening 1102, the first vaporizer central air passage tube opening 1513 and the second vaporizer central air passage tube opening 1514, and the first vaporizer assembly base opening 1542 and the second vaporizer assembly base opening 1543, are in the same level. When in normal operation, the first cylindrical connector opening 1101, the first vaporizer central air passage tube opening 1513, and the first vaporizer assembly base opening 1542 coincide with each other, and the second cylindrical connector opening 1102, the second vaporizer central air passage tube opening 1514, and the second vaporizer assembly base opening 1543 coincide with each other, respectively so that the E-liquid inside the E-liquid storage tank 108 is in communication with the E-liquid storage medium 152 through the first cylindrical connector opening 1101, the first vaporizer central air passage tube opening 1513, and the first vaporizer assembly base opening 1542, and through the second cylindrical connector opening 1102, the second vaporizer central air passage tube opening 1514, and the second vaporizer assembly base opening 1543, respectively to provide E-liquid to the replaceable vaporizer assembly 150 to generate E-liquid vapor for a user through the vaporizer central air passage tube 151 and the mouthpiece 102.

In certain embodiments, the replaceable vaporizer assembly 150 may be replaced by removing the mouthpiece 102 from the top of the electronic cigarette 100 as shown in FIG. 4, rotating the cylindrical connector 110 in a first direction to misalign the first cylindrical connector opening 1101 and the second cylindrical connector opening 1102 against a first vaporizer assembly mounting base opening 1542 and a second vaporizer assembly mounting base opening 1543 of a vaporizer assembly mounting base 154 to prevent the E-liquid in the E-liquid storage tank 108 from entering the replaceable vaporizer assembly 150, rotating the replaceable vaporizer assembly 150 through the vaporizer central air passage tube 151 to unscrew the external thread 1541 of the vaporizer assembly mounting base 154 from the internal thread 1201 of the vaporizer mounting base 120, pulling up the replaceable vaporizer assembly 150 as shown in FIG. 5, replacing a new replaceable vaporizer assembly 150, and reinstalling the mouthpiece 102 back in place.

In one embodiment, the first direction may be clockwise. In another embodiments, the first direction may be counter-clockwise. Such a replacement of replaceable vaporizer assembly 150 is easy, convenient, and without E-liquid contamination.

Figure 6:
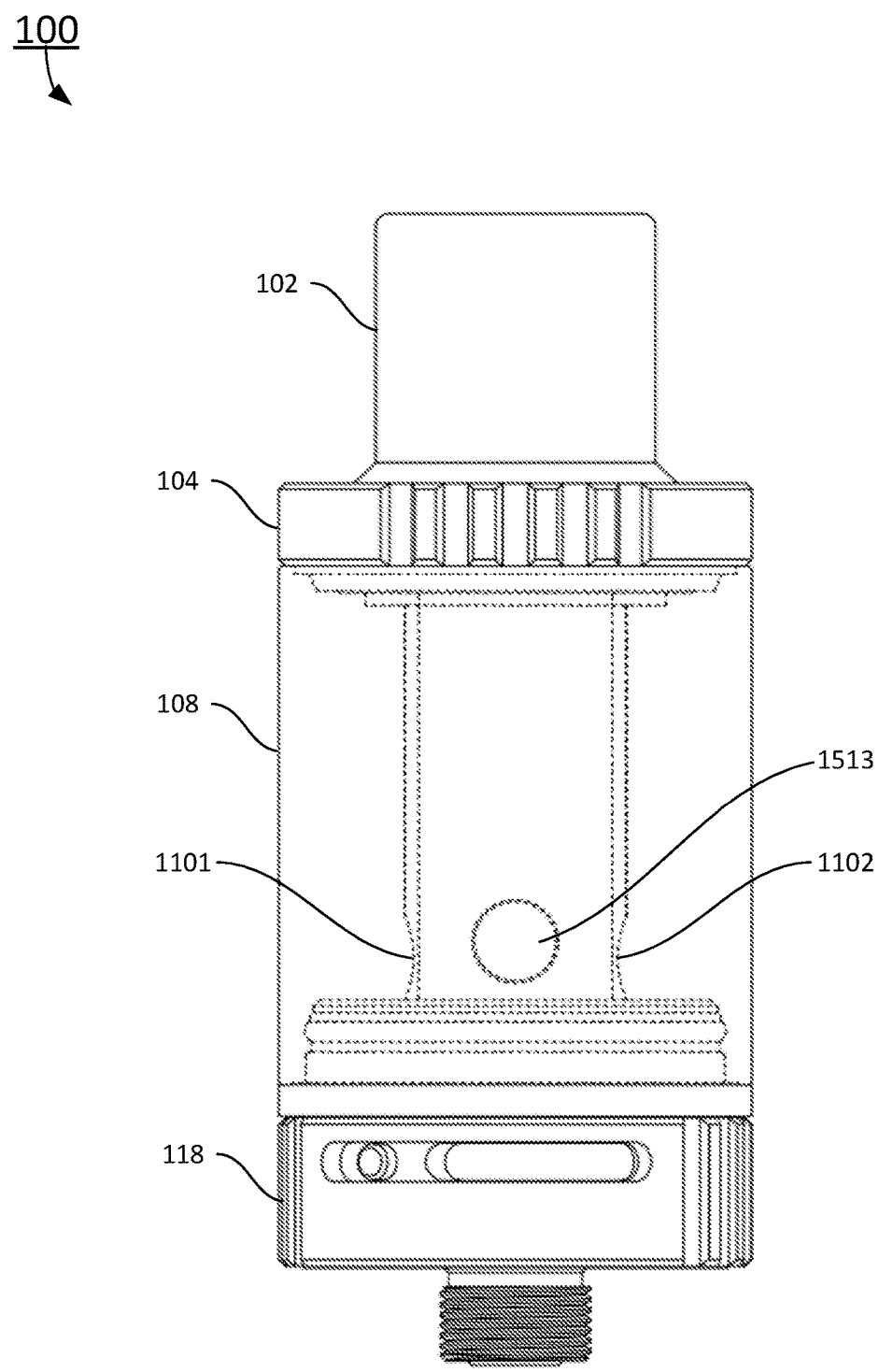
FIG. 6 is an external view of the exemplary electronic cigarette before E-liquid refill according to certain embodiments of the present disclosure.
Figure 7:
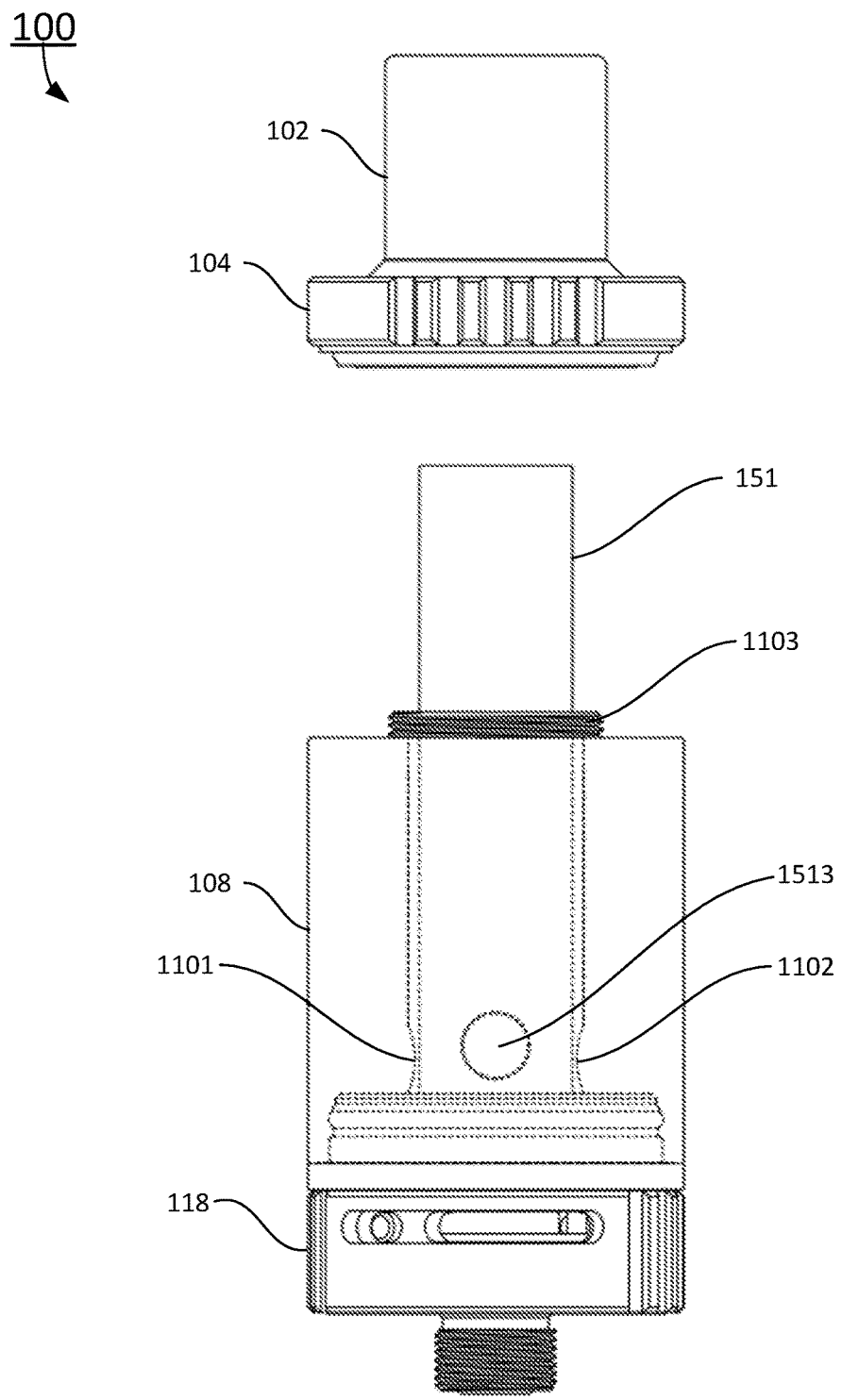
FIG. 7 is an external view of the exemplary electronic cigarette with the mouthpiece and an E-liquid storage tank cover removed for E-liquid refilling according to certain embodiments of the present disclosure.

Referring now to FIGS. 6 and 7, an external view of the exemplary electronic cigarette 100 before E-liquid refill, and the exemplary electronic cigarette 100 having the mouthpiece 102 and the E-liquid storage tank cover 104 removed for E-liquid refilling are shown, respectively, according to certain embodiments of the present disclosure.

In certain embodiments, the E-liquid storage tank 108 is positioned between the E-liquid storage tank cover 104 and the air intake base 114, sealed by a first sealing ring 106 between the E-liquid storage tank cover 104 on the top end of the E-liquid storage tank 108 and the second sealing ring 112 between the bottom end of the E-liquid storage tank 108 and the air intake base 114.

The E-liquid storage tank 108 is configured to store E-liquid between the top end and the bottom end of the E-liquid storage tank 108, the E-liquid storage tank 108 in the outside and the cylindrical connector 110 in the inside. When refilling E-liquid, the user may remove the mouthpiece 102, unscrew the E-liquid storage tank cover 104 to detach an internal thread 1043 of the E-liquid storage tank cover 104 from the external thread 1103 of the cylindrical connector 110, rotate the cylindrical connector 110 in a first direction to misalign the first cylindrical connector opening 1101 and the second cylindrical connector opening 1102 against the first vaporizer central air passage tube opening 1513 and the second vaporizer central air passage tube opening 1514 to prevent the E-liquid in the E-liquid storage tank 108 from entering the replaceable vaporizer assembly 150, and refill the E-liquid into the E-liquid storage tank 108 from the top end of the E-liquid storage tank 108. Such refilling is clean, and without E-liquid contamination.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to activate others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims, the foregoing description and the exemplary embodiments described therein, and accompanying drawings.

What is claimed is:

1. A replaceable vaporizer assembly, comprising:
   a vaporizer central air passage tube defining a first vaporizer central air passage tube opening, and a second vaporizer central air passage tube opening;
   an E-liquid storage medium;
   a heating element having a positive terminal and a negative terminal;
   a vaporizer assembly mounting base having an external thread, wherein the vaporizer assembly mounting base defines a first vaporizer assembly mounting base opening and a second vaporizer assembly mounting base opening, wherein the vaporizer assembly mounting base is electrically coupled to the negative terminal of the heating element;
   a vaporizer sealing ring;
   a vaporizer positive terminal electrically coupled to the positive terminal of the heating element; and
   a vaporizer insulation tube configured to insulate the vaporizer positive terminal and the vaporizer assembly mounting base,
   wherein the heating element is positioned inside of the E-liquid storage medium, the E-liquid storage medium is positioned inside of the vaporizer assembly mounting base, and the vaporizer assembly mounting base is positioned inside of the vaporizer central air passage tube.

2. The replaceable vaporizer assembly of claim 1, wherein the external thread of the vaporizer assembly mounting base is threadedly coupled to an internal thread of a vaporizer mounting base.

3. The replaceable vaporizer assembly of claim 2, wherein each of the external thread of the vaporizer assembly mounting base and the internal thread of the vaporizer mounting base comprises multiple threads.

4. The replaceable vaporizer assembly of claim 1, wherein the heating element comprises multiple heating elements electrically coupled in parallel to generate increased amount of vapor.

5. The replaceable vaporizer assembly of claim 1, wherein the vaporizer central air passage tube is positioned inside of a cylindrical connector and a mouthpiece, wherein the vaporizer central air passage tube is sealed by a first vaporizer central air passage tube sealing ring to prevent air leakage, and a second vaporizer central air passage tube sealing ring to prevent E-liquid leakage.

6. The replaceable vaporizer assembly of claim 5, wherein the cylindrical connector defines a first cylindrical connector opening, and a second cylindrical connector opening, wherein when the cylindrical connector is rotated such that the first cylindrical connector opening and the second cylindrical connector opening coincide with the first vaporizer central air passage tube opening and the second vaporizer central air passage tube opening, E-liquid inside an E-liquid storage tank is in communication with the E-liquid storage medium such that the E-liquid reaches the heating element through the E-liquid storage medium to generate E-liquid vapor for a user through the vaporizer central air passage tube and the mouthpiece.

7. The replaceable vaporizer assembly of claim 5, wherein the replaceable vaporizer assembly may be replaced by removing the mouthpiece, rotating the cylindrical connector in a first direction to misalign the first cylindrical connector opening and the second cylindrical connector opening of the cylindrical connector against the first vaporizer assembly mounting base opening and the second vaporizer assembly mounting base opening of the vaporizer assembly mounting base to prevent E-liquid in the E-liquid storage tank from entering the replaceable vaporizer assembly, rotating the replaceable vaporizer assembly through the vaporizer central air passage tube to unscrew the external thread of the vaporizer assembly mounting base from the internal thread of the vaporizer mounting base, pulling up the replaceable vaporizer assembly, replacing a new replaceable vaporizer assembly, and reinstalling the mouthpiece back in place, wherein the first direction comprises a clockwise and a counterclockwise.

8. A electronic cigarette comprising:
   a mouthpiece;
   an E-liquid storage tank having a top end and a bottom end;
   an E-liquid storage tank cover positioned on the top end of the E-liquid storage tank;
   a cylindrical connector having an external thread, and wherein the cylindrical connector defines a first cylindrical connector opening, and a second cylindrical connector opening; and
   an air intake base defining an air intake groove of the air intake base, wherein the air intake base is positioned at the bottom end of the E-liquid storage tank.

9. The electronic cigarette of claim 8, further comprising:
   an air intake ring adjustment ring defining an air intake groove; and
   a vaporizer mounting base defining an air intake groove,
   wherein when the air intake ring adjustment ring is rotated to a first predetermined angle and the air intake groove of the air intake ring adjustment ring, the air intake groove of the vaporizer mounting base, and the air intake groove of the air intake base are aligned such that air to a replaceable vaporizer assembly is provided from outside of the electronic cigarette, and when the air intake ring adjustment ring is rotated to a second predetermined angle and the air intake groove of the air intake ring adjustment ring, the air intake groove of the vaporizer mounting base, and the air intake groove of the air intake base are misaligned, the air to the replaceable vaporizer assembly is shut off.

10. The electronic cigarette of claim 8, wherein the E-liquid storage tank is positioned between the E-liquid storage tank cover and the air intake base, sealed by a first sealing ring 106 between the E-liquid storage tank cover on the top end of the E-liquid storage tank and a second sealing ring between the bottom end of the E-liquid storage tank and the air intake base.

11. The electronic cigarette of claim 10, wherein the E-liquid storage tank is configured to store E-liquid between the top end and the bottom end of the E-liquid storage tank, the E-liquid storage tank in the outside and the cylindrical connector in the inside, wherein when refilling E-liquid, a user may remove the mouthpiece, unscrew the E-liquid storage tank cover to detach an internal thread of the E-liquid storage tank cover from the external thread of the cylindrical connector, rotate the cylindrical connector in a first direction to misalign the first cylindrical connector opening and the second cylindrical connector opening against a first vaporizer central air passage tube opening and a second vaporizer central air passage tube opening to prevent the E-liquid in the E-liquid storage tank from entering the replaceable vaporizer assembly, and refill the E-liquid into the E-liquid storage tank from the top end of the E-liquid storage tank.

12. An electronic cigarette comprising:
an electronic cigarette having a mouthpiece, an E-liquid storage tank, an E-liquid storage tank cover, a cylindrical connector, and a vaporizer mounting base having an internal thread 120; and
a replaceable vaporizer assembly having an external thread of a vaporizer assembly mounting base,
wherein the replaceable vaporizer assembly may be replaced by removing the mouthpiece, rotating the cylindrical connector in a first direction to misalign a first cylindrical connector opening and a second cylindrical connector opening of the cylindrical connector against a first vaporizer assembly mounting base opening and a second vaporizer assembly mounting base opening of the vaporizer assembly mounting base to prevent E-liquid in the E-liquid storage tank from entering the replaceable vaporizer assembly, rotating the replaceable vaporizer assembly through the vaporizer central air passage tube to unscrew the external thread of the vaporizer assembly mounting base from an internal thread of the vaporizer mounting base, pulling up the replaceable vaporizer assembly, replacing a new replaceable vaporizer assembly, and reinstalling the mouthpiece back in place.

13. The electronic cigarette of claim 12, wherein the replaceable vaporizer assembly comprises:
a vaporizer central air passage tube defining a first vaporizer central air passage tube opening, and a second vaporizer central air passage tube opening;
an E-liquid storage medium;
a heating element having a positive terminal and a negative terminal;
the vaporizer assembly mounting base defining the first vaporizer assembly mounting base opening and the second vaporizer assembly mounting base opening, wherein the vaporizer assembly mounting base is electrically coupled to the negative terminal of the heating element;
a vaporizer sealing ring;
a vaporizer positive terminal electrically coupled to the positive terminal of the heating element; and
a vaporizer insulation tube configured to insulate the vaporizer positive terminal and the vaporizer assembly mounting base,
wherein the heating element is positioned inside of the E-liquid storage medium, the E-liquid storage medium is positioned inside of the vaporizer assembly mounting base, and the vaporizer assembly mounting base is positioned inside of the vaporizer central air passage tube.

14. The electronic cigarette of claim 13, wherein the external thread of the vaporizer assembly mounting base is threadedly connected to the internal thread of the vaporizer mounting base.

15. The electronic cigarette of claim 13, wherein each of the external thread of the vaporizer assembly mounting base and the internal thread of the vaporizer mounting base comprises multiple threads.

16. The electronic cigarette of claim 13, wherein the vaporizer central air passage tube is sealed by a first vaporizer central air passage tube sealing ring to prevent air leakage, and a second vaporizer central air passage tube sealing ring to prevent E-liquid leakage.

17. The electronic cigarette of claim 13, wherein when the cylindrical connector is rotated such that the first cylindrical connector opening and the second cylindrical connector opening coincide with the first vaporizer central air passage tube opening and the second vaporizer central air passage tube opening, E-liquid inside the E-liquid storage tank is in communication with the E-liquid storage medium such that the E-liquid reaches the heating element through the E-liquid storage medium to generate E-liquid vapor for a user through the vaporizer central air passage tube and the mouthpiece.

18. The electronic cigarette of claim 13, wherein the electronic cigarette further comprises:
the E-liquid storage tank having a top end and a bottom end;
the E-liquid storage tank cover positioned on the top end of the E-liquid storage tank;
the cylindrical connector having an external thread; and
an air intake base defining an air intake groove of the air intake base, wherein the air intake base is positioned at the bottom end of the E-liquid storage tank and sealed by a second sealing ring.

19. The electronic cigarette of claim 13, further comprising:
an air intake ring adjustment ring defining an air intake groove; and
the vaporizer mounting base defining an air intake groove,
wherein when the air intake ring adjustment ring is rotated to a first predetermined angle and the air intake groove of the air intake ring adjustment ring, the air intake groove of the vaporizer mounting base, and the air intake groove of the air intake base are aligned such that air to the replaceable vaporizer assembly is provided from outside of the electronic cigarette, and when the air intake ring adjustment ring is rotated to a second predetermined angle and the air intake groove of the air intake ring adjustment ring, the air intake groove of the vaporizer mounting base, and the air intake groove of the air intake base are misaligned, the air to the replaceable vaporizer assembly is shut off.

20. The electronic cigarette of claim 19, wherein the E-liquid storage tank is positioned between the E-liquid storage tank cover and the air intake base, sealed by a first sealing ring 106 between the E-liquid storage tank cover on the top end of the E-liquid storage tank and the second sealing ring between the bottom end of the E-liquid storage tank and the air intake base, wherein the E-liquid storage tank is configured to store E-liquid between the top end and the bottom end of the E-liquid storage tank, the E-liquid storage tank in the outside and the cylindrical connector in the inside, wherein when the E-liquid in the E-liquid storage tank needs to be refilled, a user may remove the mouthpiece, unscrew the E-liquid storage tank cover to detach an internal thread of the E-liquid storage tank cover from the external thread of the cylindrical connector, rotate the cylindrical connector in a first direction to misalign the first cylindrical connector opening and the second cylindrical connector opening against the first vaporizer central air passage tube opening and the second vaporizer central air passage tube opening to prevent the E-liquid in the E-liquid storage tank from entering the replaceable vaporizer assembly, and refill the E-liquid into the E-liquid storage tank from the top end of the E-liquid storage tank.

* * * * *